Sept. 20, 1932. C. T. WALTON 1,878,078
DEVICE FOR THE TRANSMISSION OF POWER
Filed July 3, 1930 2 Sheets-Sheet 1
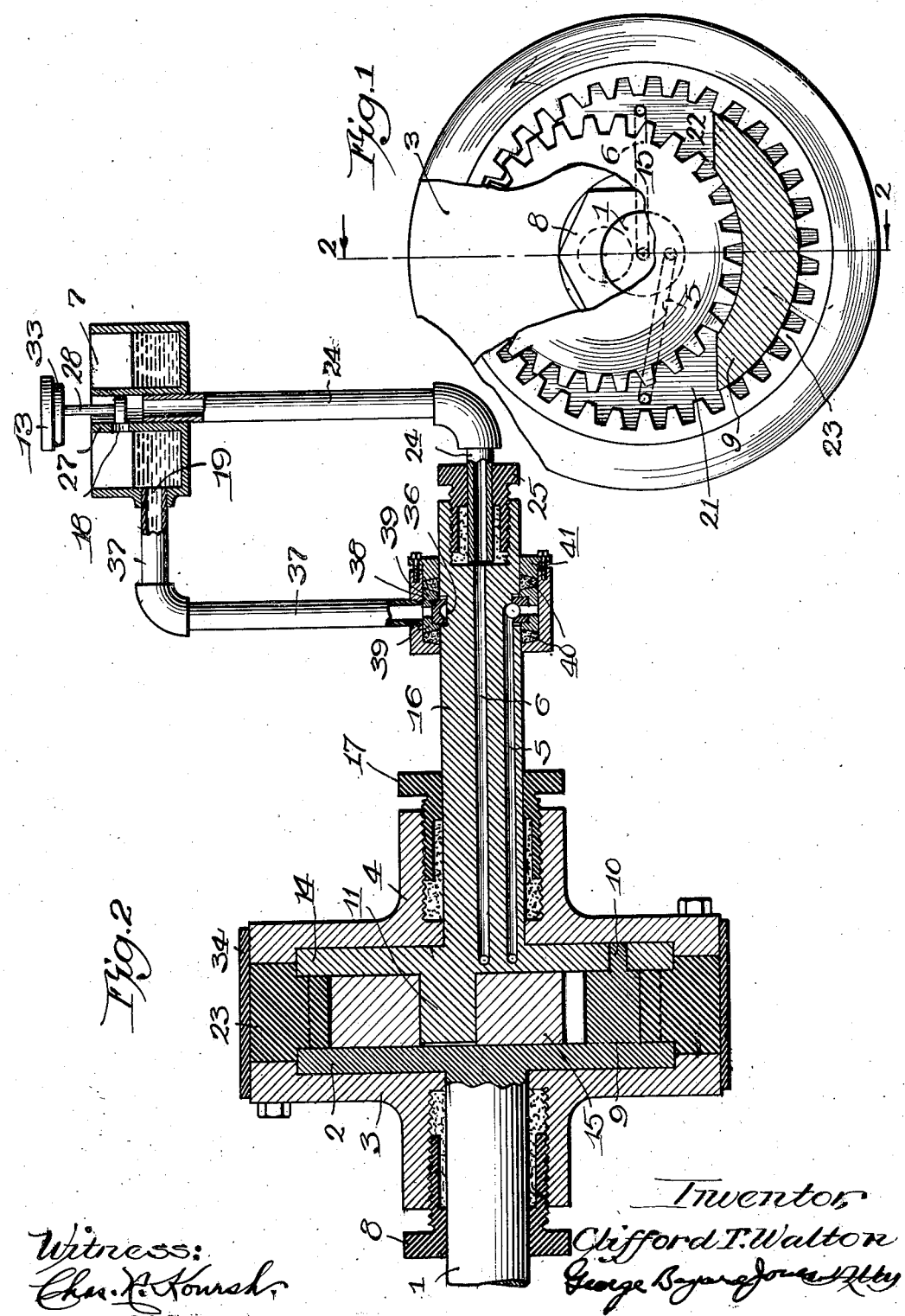

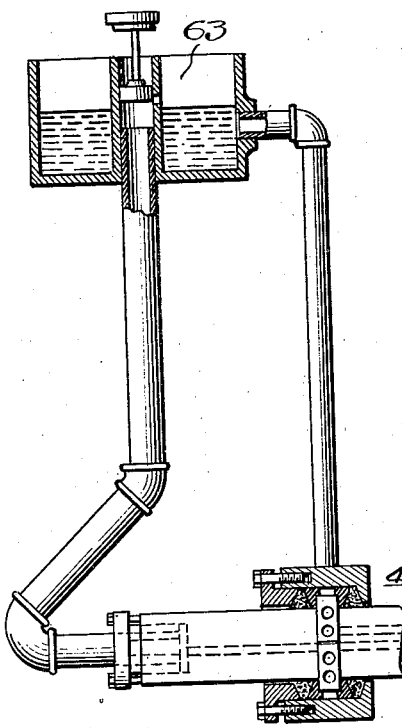
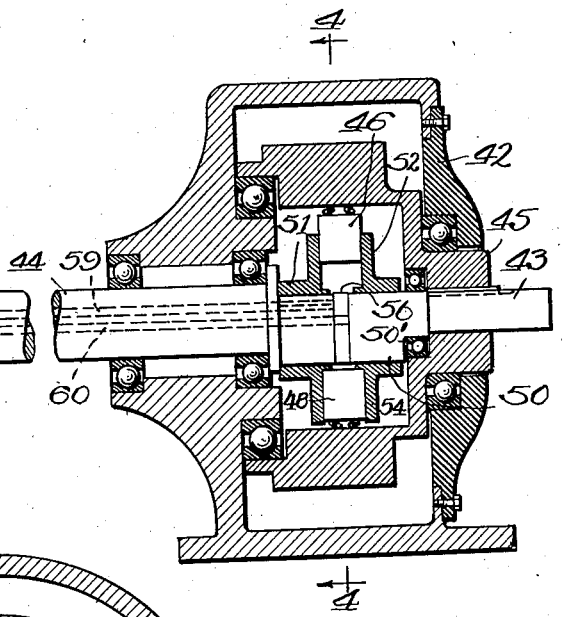
Fig.3
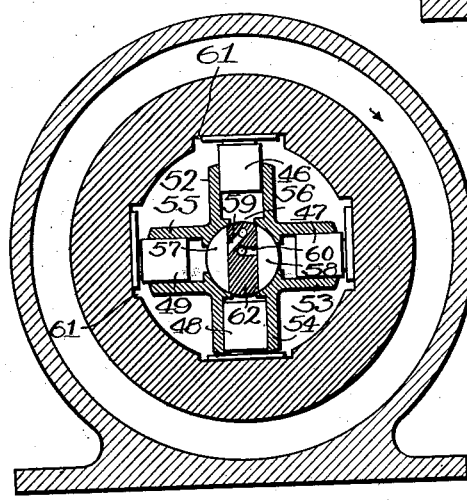
Fig.4

Patented Sept. 20, 1932

1,878,078

UNITED STATES PATENT OFFICE

CLIFFORD T. WALTON, OF MADISON, WISCONSIN, ASSIGNOR TO C. F. BURGESS LABORATORIES, INC., OF MADISON, WISCONSIN, A CORPORATION OF DELAWARE

DEVICE FOR THE TRANSMISSION OF POWER

Application filed July 3, 1930. Serial No. 465,629.

This invention relates to improvements in devices for the transmission of power, more particularly the hydraulic transmission of rotational power as exemplified by the cases where the prime mover and the load are both rotating devices.

It is the general and primary object of this invention to provide an hydraulic power transmission device capable of delivering a regulable torque.

Other and further objects will become apparent as the following description progresses which is to be taken in conjunction with the accompanying drawings, in which Fig. 1 is an end view with certain parts broken away of one embodiment of my invention;

Fig. 2 is a part sectional view along line 2—2 of Fig. 1;

Fig. 3 is a sectional view of another embodiment of my invention;

Fig. 4 is a sectional view along the line 4—4 of Fig. 3.

The device illustrated in Figs. 1 and 2 is in the general form of a pulley which is adapted to transmit power from the driving belt to the shaft or vice versa. For purposes of convenience and illustration it may be assumed that power is to be transmitted from the belt to the shaft 1 and that in the particular application illustrated, said shaft is mechanically connected to the shaft of a paper mill drying roll. It is rigidly fastened to or may be integral with a circular plate 2 which rests against the interior face of end-closure 3 and passes through stuffing box 8 being journaled in said end closure. In a similar manner, shaft 16 passes through stuffing box 17 and is journaled in flanged end-closure 4 and carries upon its inner end a circular plate 14 which rests against the interior face of end-closure 4. End-closures 3 and 4 comprise the housing of the mechanism and may be bolted to internal gear member 23 as shown or may be otherwise formed. The cylindrical exterior surface should be wide enough to serve its purpose as a pulley. This surface may also be toothed and be used as a gear.

Circular plate 2 has a lateral arc-shaped projection, which will be called block 9. The arc-shaped surfaces of block 9 are smooth. Rigid connection is maintained between circular plates 2 and 14 by means of one or more pins or pinlike projections 10 from block 9 which engage cooperating holes in plate 14. Plate 14 has a cylindrical projection 11 integral with or fixed to its interior surface. Projection 11 serves as a spindle or shaft for the free rotation of pinion 15. The teeth of internal gear 23 and pinion 15 mesh along their uppermost portions when they are in the position shown in Figs. 1 and 2. The ends of the teeth of the pinion and the gear pass along the inner and outer arc-shaped surfaces respectively of block 9. The surfaces are machined to provide an exact machine fit. Chambers 21 and 22 are thus provided between the ends of block 9 and the teeth of gear 23 and pinion 15. Chambers 21 and 22 are adapted to receive a liquid such as oil and are connected with each other by means of a closed circulating system comprising channels 5 and 6 which communicate with chambers 21 and 22 respectively and traverse plate 14 and shaft 16. Channel 5 terminates in a peripheral groove 36 in the end portion of shaft 16. Surrounding groove 36 is a packing gland which is adapted to transmit the oil to pipe 37. The packing gland comprises grooved collar 38 which fits into groove 36 and which itself has an annular groove upon its internal face. Collar 38 also has radial holes at intervals along its length. Fitting against the outer corners of collar 38 are two ring members 39. Between the two ring members 39 space is left for a channel. Packing material 40 is compressed against the faces of ring members 39 which are removed from each other, the compression being obtained by means of ordinary packing gland 41. Packing gland 41 is provided with an opening which communicates with the channel between ring members 39. Into this opening pipe 37 is threaded. Channel 6 communicates with piping system 24, fluid-tightness being provided by stuffing box 25.

Pipe 24 leads to combination valve and reservoir 7 which comprises a valve body 27, which is shown located centrally within the surrounding reservoir. The interior of valve body 27 is of smooth cylindrical shape and constitutes the valve seat. Valve 28 is a piston which is adapted to move up and down within body 27. Valve 28 supports platform 33 which is adapted to have weights 13 placed thereon. Springs may be used in place of weights 13, such springs being properly arranged to urge valve 28 toward its closed position with the desired pressure. The upper portion of the side wall of valve body 27 has an opening 18 therein. The side wall of reservoir 7 has an opening 19 therein into which piping 37 is connected.

The operation of the device is as follows: With belt 34 driving gear 23 in a counter clockwise direction as it is viewed in Fig. 1, the teeth of gear 23 and pinion 15 move to the right relatively to block 9. With chamber 21 filled with oil, such movement of the teeth causes the entrapment of small quantities of oil within the spaces between adjacent teeth. The oil is thus transferred from chamber 21 to chamber 22. As the teeth of the gear and pinion pass out of chamber 22 they mesh with each other and substantially all of the oil is forced out of the spaces between the teeth. Thus there is practically no direct return of oil from chamber 22 to chamber 21. Such return is provided for by means of the closed circulation system heretofore described. The oil passes out of chamber 22 into channel 6, thence thru piping 24, valve mechanism 7, piping 37, packing gland 41, between ring members 39, through the holes and groove in collar 38, into groove 36 and thence through channel 5 into chamber 21.

In the event that the valve 28 is opened wide, permitting free flow of oil therethrough the device will merely act as an oil circulating system and shaft 1 will remain stationary. If, however, resistance is offered by means of valve 28 to the flow of oil, pressure will be built up within chamber 22 proportional to the resistance offered by valve 28. Further transfer of oil from chamber 21 to chamber 22 is only accomplished by forcing oil into chamber 22 against this pressure. The entire mechanism, except the valve and piping, is relatively free to revolve, depending upon the resistance to rotation offered by the load upon shaft 1. The only way in which the transfer of oil into chamber 22 can be prevented is by the rotation of block 9 with the gear and pinion. When the pressure within chamber 22 becomes sufficient to overcome the resistance offered to the rotation of shaft 1, block 9 will rotate with the pinion and gear. The torque transmitted to shaft 1 is, therefore, proportional to the pressure within the chamber 22 which in turn is proportional to the resistance offered to the flow of the oil by valve mechanism 7. An important advantage is that the torque is independent of the viscosity of the liquid used and the velocity of the driving member. The regulation of the resistance to flow through valve 7 is accomplished by regulating the weight or spring which piston 28 is made to carry.

In stating the relation of one part to another of my improved transmission device, the unit comprising shaft 1, plate 2, and block 9 may be considered the driven member. Since the unit comprising plate 14, spindle 11 and shaft 16 are rigidly connected to block 9, they may also be considered part of the driven member. The driving member comprises gear 23 and pinion 15, the latter being properly included because it is geared positively to gear 23 and contributes materially to the transfer of oil from chamber 21 to chamber 22.

The operation of the device may also be described as follows: Assume that the oil in chamber 22 is under pressure, the meshing of gear 23 with pinion 15 is accomplished only by forcing oil from the spaces between the teeth back into chamber 22 against the pressure therein. The small quantities of oil in the spaces act as deformable wedges tending to lock the two gears together. Any resistance to the free intermeshing of the two gears exerts a force upon spindle 11 which is eccentric of the axis of rotation of shaft 1 and hence exerts a torque upon the interlocked shafts 1 and 16. The torque, again, is proportional to the pressure within chamber 22, which in turn is proportional to the resistance offered to the flow of oil through valve 7.

The closed circulating system must have sufficient capacity to freely pass the maximum quantity of oil which the transmission mechanism is liable to pump to take care of conditions under which it is desired to maintain shaft 1 stationary while belt 34 and gears 23 are running.

Figs. 3 and 4 illustrate a transmission device which operates upon piston displacement principle.

Within stationary housing 42, shafts 43 and 44 are rotatably mounted. It is immaterial whether power is received from shaft 43 and delivered by shaft 44 or vice versa but for convenience I will consider shaft 43 as being the driving shaft. Shaft 43 may be keyed or otherwise rigidly connected to rotating bracket member 45, which is shown as being mounted upon ball bearings in housing 42. Pistons 46, 47, 48 and 49 are slidably mounted upon the inside of bracket 45 as will be explained hereinafter.

Shaft 44 is also shown as being journalled upon ball bearings in housing 42. Upon the inner end of shaft 44 there is an eccentric extension or crank 50. The end of crank 50 is shown as being journalled upon ball bearings 50' mounted upon the innerside of bracket 45. Collar 51 surrounds crank 50 and is free to rotate thereupon. Collar 51 carries a plurality of cylinders 52, 53, 54 and 55, arranged in radial relation. Each cylinder has an opening 56 in its inner end. Registering with openings 56 are transverse slots 57 and 58 in crank 50. Channels 59 and 60 extend longitudinally through crank 50 and shaft 44 and communicate respectively with slots 57 and 58. Channels 59 and 60 terminate in a closed liquid circulating system and pressure-regulating valve 63 similar to that described in connection with the device illustrated in Figs. 1 and 2 and a repetition of such description is not considered necessary.

The operation of the device is as follows. The circulating system is filled with liquid, preferably oil and a source of power causes rotation of shaft 43. As mentioned heretofore, pistons 46, 47, 48 and 49 are slidably mounted upon flattened portions 61 of the inner side of bracket 45. Surfaces 61 are spaced equal distances radially from the axis of bracket 45. As viewed in Fig. 4 the pistons are free to move sidewise but their axes are maintained perpendicular to surfaces 61. Thus rotation of bracket 45 causes rotation of collar 51. The center line of crank 50 is eccentric of the axis of rotation of bracket 45, hence the axis of rotation of collar 51 is eccentric of that of bracket 45.

With crank 50 remaining stationary and bracket 45 rotating in the direction indicated by the arrow of Fig. 4 piston 47 is moving inwardly in cylinder 53. Oil is being pumped into channel 60, thence through the circulating system and pressure regulating valve, returning through channel 59, and into cylinder 55.

Openings 56 in the cylinders are smaller than the ends of the portion 62 of crank 50 which lies between slots 57 and 58. This is necessary in order to prevent the free flow of oil between slots 57 and 58 at all times. This does not interfere with the pumping action of pistons 46 and 48 since at that moment they are not pumping any oil because their movement relative to their cooperating cylinders is nil. Any appreciable overlapping of the sides of openings 56 by portion 62 must be avoided to guard against the interference which will otherwise result.

As long as no resistance is offered to the flow of oil in the circulating system, bracket 45 will revolve freely while crank 50 remains stationary. When resistance is offered to the flow of oil, pressure is built up in cylinder 53 or any cylinder which is in communication with slot 58. This pressure will be exerted against the surfaces of crank 50 and slot 58. Such pressure may be resolved into a component of force acting through the center line of crank 50. Since the center line of crank 50 is eccentric of the axes of rotation of shaft 44, a torque will be exerted upon the latter, which will be in proportion to the pressure within the cylinders in communication with slot 58, which in turn will be in proportion to the pressure resistance offered to the flow of oil through the circulating system by pressure-regulating valve 63. In conclusion, the torque transmitted from shaft 43 to shaft 44 is again regulable by means of pressure-regulating valve 63. The driving member of the transmission device is considered to comprise shaft 43, bracket 45, pistons 46, 47, 48, and 49, and collar 51 with its cylinders, while the driven member is considered to be crank 50 and shaft 44.

The relation of shafts 43 and 44 may be reversed at will. In the event that it is desired to use shaft 44 as the driving shaft, the direction of rotation must be the reverse of that indicated by the arrow in Fig. 4 or else pressure regulating valve 63 must be reversed in its relation to channels 59 and 60 to adapt it to the function of building up a pressure in channel 59 instead of 60.

My regulable torque transmission device is particularly useful in connection with paper mill drying equipment of the type comprising a succession of revolving heated drums or rolls over which the wet web of paper is passed and dried. It is a fact well known in the paper-making industry, that as a paper web is dried, more or less shrinkage takes place, depending upon the character of the paper fibers and the mode of drying. If each successive drum revolves at the same surface speed, a longitudinal tension is built up as the paper becomes more and more dry until a point is reached at which the web becomes ruptured. Many types of drives have been devised for dryer rolls, most of them providing for a fixed decrease of the speed of successive rolls. Such arrangements do not solve the problem unless paper stock of the same character is used at all times. Practically, such a condition is extremely difficult of attainment, if not impossible. Individual batches of paper stock which shrinks more than the shrinkage allowed for will rupture, while that which shrinks less will accumulate between the rolls, both of which conditions are troublesome and unsatisfactory. With my improved transmission device it is possible to adjust the pressure-regulating valve so that the driven shaft will transmit torque sufficient to overcome the frictional resistance to rotation of the dryer drums but insufficient to rupture the paper web. In such manner compensation for shrinkage of the paper web becomes automatic.

My transmission device is not limited in its application to paper mill dryers but is adaptable to a wide range of uses where the transmission of a regulable torque is desired.

It will be noted that my improved transmission device comprises essentially a liquid pump, and while but two types of such pumps are illustrated it is understood that I do not wish to be limited to such types except as the appended claims are limited but that I contemplate using any suitable type of positive force pump, as exemplified by pumps of the displacement type.

What I claim is:

1. Mechanism for transmitting regulable torque comprising, in combination, a casing, driving and driven members mounted in said casing for relative rotation, a plurality of cylinders and a plurality of pistons mounted upon said driving member, inlet and outlet passages in said driven member communicating with said cylinders whereby a liquid may be drawn into and discharged from said cylinders through said passages by said pistons by relative rotation of said members, a conduit connecting said inlet and outlet passages, and means in said conduit for opposing with regulable pressure the flow of liquid through said conduit.

2. Mechanism for transmitting regulable torque comprising, in combination, a casing, driving and driven shafts mounted in said casing for relative rotation, a crank upon one of said shafts, a plurality of cylinders rotatably mounted upon said crank, a plurality of pistons mounted for rotation with the second shaft and adapted to rotate with and reciprocate in said cylinders upon relative rotation of said shafts, inlet and outlet passages through said first shaft and said crank communicating with said cylinders, whereby a liquid may be drawn into and discharged from said cylinders through said passages by relative rotation of said shafts, a conduit connecting said inlet and outlet passages, and means in said conduit for opposing with regulable pressure the flow of liquid through said conduit.

In testimony whereof, I have subscribed my name.

CLIFFORD T. WALTON.